Feb. 19, 1957   N. J. JEFFERSON   2,781,720
JUICE EXTRACTOR
Filed Dec. 20, 1954
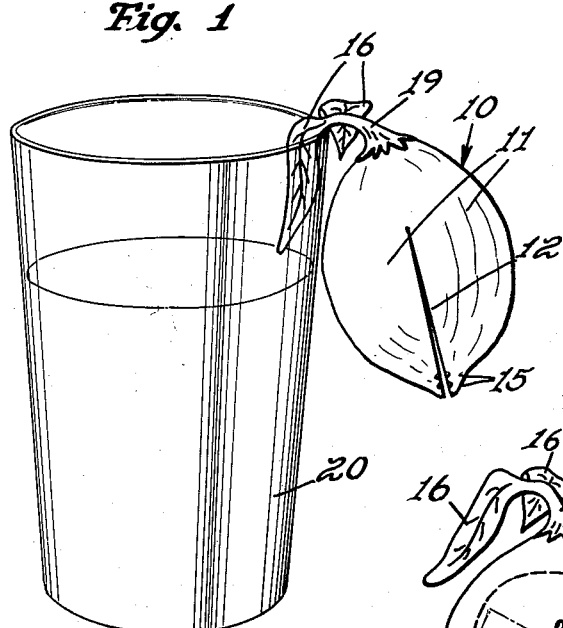
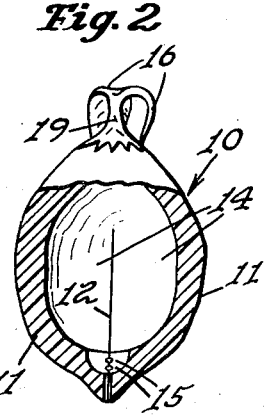
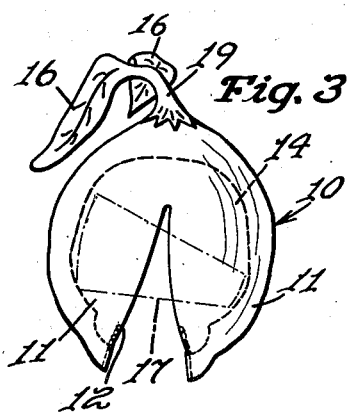
INVENTOR.
Norma J. Jefferson
BY Victor J. Evans & Co.
ATTORNEYS

United States Patent Office 2,781,720
Patented Feb. 19, 1957

2,781,720

JUICE EXTRACTOR

Norma J. Jefferson, Belhaven, N. C., assignor of one-half to E. S. Jefferson, Belhaven, N. C.

Application December 20, 1954, Serial No. 476,391

1 Claim. (Cl. 100—211)

This invention relates to a juice squeezer or extractor, and more particularly to a device for extracting juice from slices or wedges of lemons, limes and the like.

The object of the invention is to provide a device for squeezing lemon, lime, or other citrus fruits whereby the juice can be extracted from the fruit without the necessity of contacting the fruit with the fingers.

Another object of the invention is to provide a juice extractor which can be made of yieldable material such as rubber whereby the juice can be manually forced from a lemon or lime and wherein the device can be readily suspended or hung from the upper edge of a glass, the device being easy to clean and highly attractive to use.

A further object of the invention is to provide a juice extractor which is extremely simple and inexpensive to manufacture.

Other objects and advantages will be apparent during the course of the following description.

In the accompanying drawings, forming a part of this application, and in which like numerals are used to designate like parts through the same:

Figure 1 is a perspective view showing the juice extractor of the present invention mounted on the upper edge of a glass such as a glass of ice tea.

Figure 2 is an elevational view of the juice extractor, with parts broken away and in section.

Figure 3 is an elevational view of the extractor, showing the sections or halves partially opened as when a lemon slice or wedge is positioned therein.

Figure 4 is a perspective view showing juice being squeezed from the lemon or lime wedge.

Figure 5 is a perspective view showing the manner of opening the device as when it is to be cleaned or sterilized.

Referring in detail to the drawings, the numeral 10 designates the juice extractor of the present invention which can be made of a suitable yieldable or resilient material such as rubber. The extractor includes a body that has the external shape or configuration of a piece of citrus fruit for example, such as a lemon, lime, or orange. The device is provided with an elongated slit or slot 12 which defines a pair of halves or sections 11 that are mounted for movement toward and away from each other. The interior of the body is hollowed out or recessed as at 14 for receiving therein a wedge or slice of a lemon or lime which is indicated by the numeral 17, Figure 3. There is further provided a plurality of apertures or openings 15 through which the juice indicated by the numeral 18 in Figure 4 can pass.

Formed integral with the rubber of plastic body are leaves or support members 16 which may be connected to the body of the device by means of a stem 19. In actual practice the leaves 16 may be arranged in engagement with the upper edge of a glass 20 as shown in Figure 1 whereby the device can be supported on the glass until it is to be used to provide an attractive assembly. The leaves 16 and stem 19 may be painted or colored green, while the outer surface of the sections 11 may be of a different color such as yellow.

From the foregoing it is apparent that there has been provided a juice extractor or juice squeezer which is especially suitable for squeezing and holding wedges or slices of lime or lemon such as the wedge 17 shown in Figure 3. In use the device may be mounted on a glass such as the glass 20 through the medium of the leaf shaped support members 16. The sections 11 can be opened or moved away from each other as shown in Figure 5 when the device is to be cleaned or when the wedge 17 is to be inserted therein. Then, when pressure on the sections 11 is released, the parts will assume the position shown in Figures 2 and 3 to clamp or hold the wedge 17 therein. Then, by applying manual pressure on the resilient body or sections 11, the juice from the wedge 17 will be squeezed therefrom and this juice will run out through the apertures 15 and out through the slot 12 onto the food or into the glass 20 or wherever desired.

The juice extractor of the present invention receives cut portions of a lemon or lime or any other fruit so that with one hand a person can press on both sides of the device with the thumb and forefinger as shown in Figure 4 whereby the wedge of lemon or lime will be caused to be squeezed without the person touching the lemon or lime. Figure 1 shows the device being used when it is hung on the glass 20 with a piece of lemon inside and ready to be served. Figure 4 shows the squeezing of the juice extractor with the lemon or lime inside and the numeral 15 designates the juice vents. The cavity or recess 14 receives the lemon, lime or other fruit. In use, the lemon or lime or other fruit is first cut into a wedge or slice and then placed inside the device. Then by pressing on the device the juice will be squeezed into the desired location. The present invention eliminates the possibility of squeezing juice into the eyes or onto a person sitting at the table and also eliminates unsanitary lemon juice since the hands do not come in contact with the fruit during the squeezing thereof. Furthermore, the flies will not come in contact with the lemon and the fingers will not get messed up and there will be no chance of the lemon juice getting on the clothing to discolor the clothing. Also, the device can be easily cleaned and sterilized and can be made and sold at a low cost and is relatively indestructible.

The device can be made out of tough resilient material such as gum rubber whereby the user can feel the lump of lemon inside the juicer through the resilient sides 11 of the juicer and this permits the user to mash the lemon wedge and extract all the juice by merely feeling out the wedge of lemon through the soft sides of the juicer. Furthermore, the device can be cast in one complete piece and can be turned inside out with the fingers for sterilizing as shown in Figure 5. The juice extractor is shaped to resemble a lemon or lime or may have any other desired shape and the stem 19 may be molded or secured to the rest of the article with the two leaves 16 if desired. The leaves 16 are highly decorative and also serve to provide a means for easily attaching or removing the juicer from the top rim of a glass of ice tea or other drink which is customarily served with lemon or other juices. The device can be made in any different size for example it may be of a size for ice tea glasses and I have a larger size to serve lemon or lime or other juices on fish, shrimp, or steak or other dishes. The device can be made so that it can be attached to the plate and it can be made of plastic, rubber or any other suitable material. The inner cavities in both halves 11 accommodate the piece of lemon, lime or other fruit and the two halves can be attached by molding as shown in the drawings and the device retains its natural shape without the piece of lime or lemon inserted. If the device is made of a stiffer substance such as plastic or metal or other stiffer material, then a stainless steel spring can be attached to both halves in such a manner as to force the two halves together with a slight pressure. After the juice has been forced from the fruit, the two halves 11 will continue to exert pressure to hold the remainder of the fruit within the body until it is desired to clean out same.

I claim:

A one piece juice extractor comprising a hollow collapsible body of elastic material providing a normally closed receptacle adapted for reception therein of a slice of fruit to be squeezed, said body having an elongated slit therein providing a pair of opposed wall members normally urged towards contacting relationship along the confronting edges of said slit, said members being spreadable to open said slit for providing entrance in said body of a slice of fruit, said body having apertures therein disposed along the confronting edges of said slit for permitting egress therethrough of juice expressed from said fruit when said body is collapsed, and a stem on said body opposite said slit having leaf shaped support members extending therefrom adapted to support said body on the upper edge of a container in at least one position wherein said apertures open substantially downwardly.

References Cited in the file of this patent

UNITED STATES PATENTS

| | | |
|---|---|---|
| 361,748 | Culbertson | Apr. 26, 1887 |
| 820,067 | Richardson | May 8, 1906 |
| 946,668 | Filler | Jan. 18, 1910 |
| 1,305,806 | Keppeler | June 3, 1919 |
| 1,835,966 | Pochyla | Dec. 8, 1931 |
| 1,836,062 | Biegeleisen | Dec. 15, 1931 |
| 1,858,435 | Conlon | May 17, 1932 |
| 2,014,236 | McNamara | Sept. 10, 1935 |